(12) United States Patent
Moon et al.

(10) Patent No.: US 12,330,024 B2
(45) Date of Patent: Jun. 17, 2025

(54) COLOR GOLF BALL WITH NATURAL METALLIC GLOSS

(71) Applicant: VOLVIK INC., Chungcheongbuk-do (KR)

(72) Inventors: Kyung Ahn Moon, Seoul (KR); Sang Wook Park, Seoul (KR)

(73) Assignee: Volvik Inc., Chungcheonbuk-do (KR)

( * ) Notice: Subject to any disclaimer, the term of this patent is extended or adjusted under 35 U.S.C. 154(b) by 0 days.

(21) Appl. No.: 17/118,725

(22) Filed: Dec. 11, 2020

(65) Prior Publication Data

US 2021/0178230 A1    Jun. 17, 2021

(30) Foreign Application Priority Data

Dec. 12, 2019   (KR) .................. 10-2019-0165847
Dec. 4, 2020    (KR) .................. 10-2020-0168011

(51) Int. Cl.
| *A63B 37/06* | (2006.01) |
| *A63B 37/00* | (2006.01) |
| *C09D 5/00* | (2006.01) |
| *C09D 7/40* | (2018.01) |
| *C09D 175/04* | (2006.01) |

(52) U.S. Cl.
CPC .... *A63B 37/00223* (2020.08); *A63B 37/0074* (2013.01); *A63B 37/0075* (2013.01); *C09D 5/002* (2013.01); *C09D 7/67* (2018.01); *C09D 7/68* (2018.01); *C09D 175/04* (2013.01); *A63B 2209/00* (2013.01)

(58) Field of Classification Search
CPC ................................................ A63B 37/0022
USPC .......................................................... 473/378
See application file for complete search history.

(56) References Cited

U.S. PATENT DOCUMENTS

| 5,427,378 A | * | 6/1995 | Murphy .............. A63B 43/06 |
| | | | 473/378 |
| 6,554,723 B1 | * | 4/2003 | Kametani ....... A63B 37/00221 |
| | | | 473/378 |
| 8,029,386 B2 | | 10/2011 | Watanabe |
| 2003/0130061 A1 | * | 7/2003 | Rajagopalan ...... A63B 37/0052 |
| | | | 473/378 |
| 2007/0015603 A1 | * | 1/2007 | Watanabe ....... A63B 37/00376 |
| | | | 473/371 |
| 2008/0009370 A1 | * | 1/2008 | Lin .................. B29C 45/14819 |
| | | | 473/378 |
| 2017/0233595 A1 | * | 8/2017 | Erdodi ................ D06P 1/5278 |
| | | | 428/201 |

FOREIGN PATENT DOCUMENTS

BA    10-0931558 B1    12/2009

* cited by examiner

*Primary Examiner* — Raeann Gorden
(74) *Attorney, Agent, or Firm* — Losey PLLC

(57) ABSTRACT

A color coating solution is produced by dispersing a nano-color pigment and a metallic gloss pigment into a polymer resin, and the solution is coated and molded on a cover layer having a color similar to that of the color coating solution. Since the pigment composition is different between the cover layer and the color coating layer, internal shieldability is improved. As a result, a dark color or uneven surface of the core, mantle, or cover is not exposed, so that a surface defect rate can be reduced. Since both the nano-color pigment and the metallic gloss pigment are used in the color coating layer, the metallic gloss and the color are exhibited in a single layer. Therefore, it is possible to provide natural metallic gloss without a strange texture feeling.

18 Claims, No Drawings

COLOR GOLF BALL WITH NATURAL METALLIC GLOSS

CROSS REFERENCES TO RELATED APPLICATIONS

The present application claims priority to Korean Patent Application No. 10-2019-0165847, filed in the Korean Patent Office on Dec. 12, 2019 and Korean Patent Application No. 10-2020-0168011, filed in the Korean Patent Office on Dec. 4, 2020, the entire contents of which are incorporated herein by references.

FIELD

The present invention relates generally to a color golf ball having natural metallic gloss.

BACKGROUND

Conventionally, performances of a golf ball such as a flight distance, controllability, durability, and shot feeling has been evaluated as a factor directly affecting a competition result. However, recently, a range of the performance tends to expand also to appearance of the golf ball to allow golf players to stabilize their psychology and improving their concentration. The color golf balls can help the player's psychological stability by improving color, visibility, texture, and the like.

The color golf ball may have a red, green, yellow, orange, or pink color, a fluorescent color thereof, or a metallic gloss color obtained by adding corresponding colors. For this purpose, a color pigment or dye, a fluorescent color pigment or dye, and a metallic gloss pigment are appropriately mixed and used in the golf ball. The golf ball obtained by mixing the pigments has higher visibility due to its unique color and makes the ball look bigger to allow a player to easily find the ball on the green or in the field.

In particular, a vivid color golf ball having a matte and fluorescent color improves visual satisfaction of players with a brighter and showier color than that of the conventional color golf ball. In addition, due to its excellent visibility, it is possible to reduce ball searching efforts called "finding my ball" in night games. Therefore, the vivid color golf balls replace the conventional white golf balls very fast.

The metallic gloss pigment means a pigment that produces a pearl color, an iridescent color, and a metallic color. The metallic gloss pigment has a thin plate-shaped form having a high refractive index capable of partially reflecting or transmitting incident light.

The metallic gloss pigments are classified into two types, a metallic pigment and an interferential pigment, depending on reflection and transmission patterns of the incident light. The metallic pigment means a pigment having a property that all incident visible light beams are specularly reflected in one direction to exhibit a strong metallic gloss. The interferential pigment is a pigment having a transparent and flat multi-layered structure and causes multi-stage total reflection in which, as the incident visible light passes through each layer, a part of the incident light is reflected on the surface of the object, and the rest transmits. The interferential pigment exhibits a strong three-dimensional effect, gloss, and various interferential colors, and is similar to the aforementioned metallic pigment in that it causes total reflection. However, the interferential pigment is different in that multi-stage reflection occurs by transmission light, and thus an interferential color having a three-dimensional effect is realized.

U.S. Pat. No. 8,029,386 relates to a golf ball having a metallic gloss, in which a core and an inner cover are formed, and an outer cover layer is formed around the inner cover. The outer cover layer is characterized in that an interferential pigment having metallic gloss is added by 0.05 to 0.5 parts with respect to 100 parts of a resin composition, and the interferential pigment may be mica coated with 25 to 70% of a metal oxide. The golf ball of the U.S. Pat. No. 8,029,386 may have strong metallic gloss due to total reflection by the interferential pigment, but the strong metallic gloss may rather give a completely different texture from that of the conventional golf balls and may hinder a play. In addition, when a transparent coating layer is further formed to protect the outer cover, the transparent coating layer and the outer cover layer may be visually separated to give a feeling that the spheres are overlapped with each other. Furthermore, when the information such as logos or directional arrows is printed on the cover layer, the printed pattern is re-illuminated on the metallic gloss surface and may look incomprehensibly complex. Moreover, metal oxides contained in the coating layer may reduce adhesiveness between the layers disadvantageously.

Patent documents and cited references referred to herein are incorporated merely as reference to the same extent that each document is individually and explicitly specified by referencing.

CITATION LIST

Patent Literature

Patent Literature 1: U.S. Pat. No. 8,029,386
Patent Literature 2: Korean Patent No. 0,931,558

SUMMARY

An object of the present invention is to provide a color golf ball having a color coating layer containing a nano-color pigment and a metallic gloss pigment, by which a faint metallic gloss color and excellent durability can be provided without a strange texture feeling.

Other objects and technical features of the present invention will become more apparent by reading the following detailed description, claims, and accompanying drawings.

According to the present invention, there is provided a color golf ball comprising: a white core; a cover layer formed on the core; a color coating layer formed on the cover layer, wherein the color coating layer contains a nano-color pigment and a metallic gloss pigment.

According to another the present invention, there is provided a color golf ball comprising: a core; a white mantle layer formed on the core; a cover layer formed on the mantle layer; and a color coating layer formed on the cover layer, wherein the color coating layer contains a nano-color pigment and a metallic gloss pigment.

The color golf ball according to the present invention is characterized in that the cover layer formed on the white core or the white mantle layer has a white color or a color similar to that of the nano-color pigment of the color coating layer formed on the cover layer.

The cover layer is formed using a color pigment having an average particle size of 1 to 10 μm, and the color coating layer is formed by using a nano-color pigment having an average particle size of 10 to 900 nm. In addition, the metallic gloss pigment contained in the color coating layer has an average particle size of 5 to 100 μm.

The color golf ball described above has a flop index value of 1 to 9.

The color golf ball according to the present invention is manufactured by producing a color coating solution by dispersing a nano-color pigment and a metallic gloss pigment in a polymer resin and coating and molding the solution on a cover layer having a white color or a color similar to that of the color coating solution.

The color golf ball according to the present invention is advantageous in that the internal shieldability is improved because the pigment composition is different between the cover layer and the color coating layer. When the internal shieldability is improved, a dark color or uneven surface of the core, mantle, or cover is not exposed, and a surface defect rate is reduced. In addition, since the color golf ball according the present invention is obtained by applying both the nano-color pigment and the metallic gloss pigment to the color coating layer, the metallic gloss and the color are expressed in a single layer. Therefore, it is possible to manufacture a golf ball having a natural metallic gloss without a strange texture feeling advantageously.

The color golf ball according to the present invention is advantageous in that a smaller amount of pigment is used, compared to a general color pigment, because the reflected light reflected by the metallic pigment makes the color of the nano-color pigment more vivid. Since more polymer resin can be used as much as the reduced amount of pigment, the adhesiveness of the color coating layer increases, and durability of the golf ball is improved.

In addition, since the color golf ball according to the present invention is manufactured by using a nano-color pigment having a small particle size, it does not hinder diffused reflection of the metallic gloss pigment. Therefore, it is possible to provide excellent metallic gloss and color while maintaining a color sense very similar to that of the general color pigment having conventional particle size.

DETAILED DESCRIPTION

According to the present invention, a color golf ball having a white core, a cover layer formed on the core, and a color coating layer formed on the cover layer is provided. The color coating layer contains a nano-color pigment and a metallic gloss pigment.

The core may have a single core structure produced by thermoforming a polymer resin, and may have a multi-core structure by further thermoforming a polymer resin on the core. In the case of the multi-core structure, a repulsive force and durability of the golf ball can be improved by adjusting the compositions and thicknesses of each core.

The core may be formed of a mixture containing, as a basis material, cis-1,4-polybutadiene rubber, α,β-ethylenically unsaturated carboxylic acid or metal salts of the α,β-ethylenically unsaturated carboxylic acid that induces a cross-link bonding of the cis-1,4-polybutadiene rubber, a filler, and an additive. In order to improve the repulsive force and durability of the golf ball, the golf ball may be manufactured by further mixing a polymer resin other than the cis-1,4-polybutadiene rubber which is the basis material.

The cis-1,4-polybutadiene rubber, which is a basis material of the core, has a dark tone color. Therefore, when the color of the golf ball is implemented by using a color pigment or dye, the color of the core may be projected and thereby become turbid, and an uneven surface of the thermoformed core may be exposed. This may harm the aesthetics disadvantageously. Therefore, it is necessary to add a white pigment or dye to the core to neutralize the dark color of the rubber. The pigment and the dye are similar in that they absorb light and exhibit color, but they are different in a solvent where they are dissolved. Herein, it is assumed that the pigment and the dye have the same meaning, that is, a component that exhibits the color of the golf ball, and they are classified depending on their respective chemical properties. When the core is produced in white, it may contain a single pigment or a pigment mixture obtained by mixing two or more pigments selected from a group consisting of titanium dioxide ($TiO_2$), barium sulfate ($BaSO_4$), and zinc oxide (ZnO). Preferably, zinc oxide (ZnO) is employed.

A cover layer is formed on the core. The cover layer may be formed of a polymer resin having a transparent property. For example, the cover layer may be formed of a polymer resin mixture containing one or more elements selected from a group consisting of ionomer as a thermoplastic resin, urethane as a thermosetting resin, and urethane as a thermoplastic resin. The cover layer is formed by injection molding on the core to a certain thickness. Preferably, the ionomer as a thermoplastic resin is employed.

When the cover layer is formed to be transparent, the dark color of the core is exposed to the outside of the golf ball through the transparent cover layer, or the uneven surface formed during the thermoforming process is reflected on the outside of the golf ball, which may degrade aesthetics disadvantageously.

According to the present invention, the core is implemented in white. Therefore, the problem that the dark color of the core is exposed to the outside of the golf ball through the transparent cover layer is solved. However, the uneven surface formed by the thermoforming process of the core may be exposed through the transparent cover layer regardless of the color of the core. For this reason, according to the present invention, the cover layer is formed not as a transparent cover layer but as an opaque or semi-transparent white cover layer or an opaque or semi-transparent color cover layer so as not to expose the uneven core surface.

When the cover layer is formed as an opaque or semi-transparent white cover layer, the cover layer may contain one pigment or a mixture of two or more pigments selected from a group consisting of titanium dioxide ($TiO_2$), barium sulfate ($BaSO_4$), and zinc oxide (ZnO). Preferably, titanium dioxide is employed. Furthermore, when the cover layer is formed as an opaque or translucent color cover layer, one pigment or a mixture of two or more pigments selected from various types of color pigments having a fluorescent color may be employed.

When a color other than white is implemented in the cover layer, it is preferable that the color golf ball according to the present invention has a color similar to that of the color coating layer. For example, when a golf ball having a white metallic gloss is manufactured, a color coating layer having a white metallic gloss is formed on the white cover layer. When a golf ball having a blue metallic gloss is manufactured, a color coating layer having blue metallic gloss is formed on the blue cover layer. When a golf ball having an orange metallic gloss is manufactured, a color coating layer having orange or red metallic gloss is formed on the orange or yellow cover layer. When a golf ball having pink metallic gloss is manufactured, a color coating layer having pink metallic gloss is formed on the pink cover layer. When a white color is additionally implemented on the cover layer, the color of the color coating layer is not limited. This is because the white cover layer acts as a reflector of light passing through the color coating layer to smoothen the color of the golf ball, so that it is possible to implement a pastel tone color having natural metallic gloss.

By combining colors of the cover layer and the cover coating layer as described above, color interference between the layers is reduced, and a vivid color can be implemented without distortion. In addition, even when there is color interference between layers, it is possible to implement a natural and soft pastel tone color.

A color pigment generally used for the cover layer may have an average particle size of 1 to 10 μm. In comparison, the color coating layer according to the present invention is formed by using both a nano-color pigment having an average particle size of 10 to 900 nm and a metallic gloss pigment having an average particle size of 5 to 100 μm. Since the color coating layer according to the present invention is formed by using a metallic gloss pigment having an average particle size of 5 to 100 mm at the same time, it is possible to implement a vivid color even by using the same or smaller amount of nano-color pigment as that of the color pigment having an average particle size of 1 to 10 μm.

The light incident to the golf ball is selectively absorbed or reflected by the color pigment to implement the color. The intensity of the color implemented by the color pigment is determined depending on the amount of light supplied to the color pigment.

The light incident to the golf ball according to the present invention reaches the color pigment, and at the same time, the light diffusedly reflected by the metallic gloss pigment of the color coating layer is further supplied to the color pigment. Therefore, the color pigment placed in the color coating layer according to the present invention is supplied with more light beams, and thus, more vivid color is implemented, compared to a case where the metallic gloss pigment is not contained. In addition, the incident light passes through the color coating layer and reaches the white core or the white cover layer, and all the light beams are reflected and travels to the outside through the color coating layer. In this course, the light that is reflected and travels to the outside is supplied to the color pigment of the color coating layer, and at the same time, the light diffusedly reflected (second diffused reflection) by the metallic gloss pigment is further supplied to the color pigment, so that a more vivid color is implemented. Therefore, using the color coating layer according to the present invention, it is possible to implement a more vivid color even when the same or smaller amount of nano-color pigment having an average particle size of 10 to 900 nm is used.

A nano-color pigment having an average particle size smaller than 1 μm may be employed. However, the nano-color pigment preferably has an average particle size of 10 to 900 nm, and more preferably, 100 to 700 nm. When the average particle size of the nano-color pigment is smaller than 10 nm, aggregation may occur, and the dispersibility may be reduced. When the average particle size of the nano-color pigment exceeds 900 nm, the light transmitting through the color coating layer is blocked, so that diffused reflection on the metallic gloss pigment and light reflection on the white core or the white cover layer are restricted.

The color coating layer according to the present invention is characterized in that the nano-color pigment and the metallic gloss pigment are contained at the weight ratio of 1:0.2 to 1:20. Preferably, the nano-color pigment and the metallic gloss pigment are contained in the weight ratio of 1:10. When the weight ratio between the nano-color pigment and the metallic gloss pigment is smaller than 1:0.2, there is a restriction in implementation of a vivid color using the nano-color pigment. When the weight ratio between the nano-color pigment and the metallic gloss pigment exceeds 1:20, the metallic gloss pigment is excessively aggregated, so that a surface defect may occur.

The color coating layer may be formed by producing a color coating layer mixture solution containing a polymer resin composition, a nano-color pigment, a metallic gloss pigment, and a curing agent in an organic solvent, and then coating the mixture on the cover layer. The coating method described above may include spray coating, dipping coating, or the like, and preferably, the coating method is spraying. The color coating layer mixture solution is prepared by mixing the polymer resin composition (80.25 wt %), the nano-color pigment (5 wt %), and the metallic gloss pigment (14.75 wt %), and then adding 14.3 parts by weight of the curing agent to 100 parts by weight of the polymer resin composition. The polymer resin composition may be produced by mixing polyol resin (35 to 55 wt %), toluene (5 to 15 wt %), n-butyl acetate (5 to 15 wt %), and methyl iso-butyl ketone (5 to 15 wt %), propylene glycol methyl ether acetate (1 to 10 wt %), and an additive (0.1 to 10 wt %), and the curing agent may include a polyisocyanate-based curing agent. Furthermore, the nano-color pigment and the metallic gloss pigment may have average particle sizes of 10 to 900 nm and 5 to 100 μm, respectively, and the color is not limited. Preferably, the nano-color pigment and the metallic gloss pigment have average particle sizes of 100 to 700 nm and 5 to 45 μm, respectively. A transparent coating layer may be additionally formed on the color coating layer obtained as described above to protect the golf ball, and the transparent coating layer is preferably a lustrous transparent coating layer.

The color golf ball according to the present invention has a flop index value of 1 to 9. The flop index is a value obtained by measuring the change in the reflectance by rotating the reflection angle. If the flop index value increases, the gloss increases to provide a metallic feel. The flop index will be described in detail in the following examples. In the color golf ball according to the present invention, the nano-color pigment and the metallic gloss pigment contained in the color coating layer exhibits faint and natural metallic gloss (metallic feel), which can be expressed by a flop index value of 1 to 9. Preferably, the flop index value is 1 to 7, and more preferably, the flop index value is 1 to 6. When the flop index value is lower than 1, there is no metallic gloss, and visibility is degraded. When the flop index value is higher than 9, a lot of reflected light and high metallic gloss are exhibited, thereby providing excellent visibility. However, in the case of outdoor golf competitions, the golf ball having a lot of reflected light may give a fatigue to a player, which is not preferable.

According to the present invention, there is provided a color golf ball including a core; a white mantle layer formed on the core; a cover layer formed on the mantle layer; and a color coating layer formed on the cover layer, wherein the color coating layer contains a color pigment and a metallic gloss pigment.

The mantle layer can be distinguished from the core and the cover layers in its configuration and effect, including its thickness and composition. In particular, as an effect of each element, the core improves the repulsive force. The cover layer has dimples, which allow the ball to easily fly and protects the golf ball. Meanwhile, the mantle layer increases a rotational force of the golf ball and also further improves durability. The mantle layer according to the present invention contains one white pigment or a mixture of two or more white pigments containing an element selected from a group consisting of titanium dioxide (TiO$_2$), barium sulfate (BaSO$_4$), and zinc oxide (ZnO) is produced in white. The configurations of the core, the cover layer, the color coating layer, and the transparent coating layer except for the mantle layer are similar to those described above, and they will not be repeatedly described in order to avoid redundancy.

The present invention will be described in more details with reference to the following examples.

EXAMPLES

1. Color Coating Sample Having Metallic Gloss
1) Manufacture of Color Coating Sample Having Metallic Gloss In order to measure levels of the metallic gloss depending on the type of the metallic gloss pigment or the mixed color pigment containing the color pigment, a color coating layer mixture containing the mixed color pigment was spray-coated on a Surlyn sample which is a kind of ionomer and is used for a golf ball cover. The color coating layer mixture was coated twice to form a thickness of 3 to 10 μm, and was then dried to prepare a color-coated Surlyn sample.

The color coating layer mixture used to prepare the Surlyn sample was produced by mixing a polyol polymer composition, which is a basis material, and the color mixed pigment (see Table 1).

2) Measurement of Metallic Gloss

A gloss level (flop index) was measured for the color-coated Surlyn sample produced as described above using a spectrocolorimeter (CM-M6, Konica Minolta Co. Ltd.). Since the Surlyn sample is glittering but transparent, a white substrate was placed under the sample during the glossiness measurement. The white substrate serves as a white core or mantle layer of the golf ball and reflects the light passing through the Surlyn sample.

The flop index can be expressed as the following mathematical formula 1.

$$\text{Flop Index} = \frac{2.69\,(L^*_{15°} - L^*_{110°})^{1.11}}{(L^*_{45°})^{0.86}} \qquad \text{[MathematicalFormula1]}$$

The flop index is a value obtained by measuring a change in the reflectance by rotating a reflection angle. Generally, the flop index can be obtained by measuring luminance (L*) of each reflected light beam at angles 15°, 45°, and 110°, and calculating mathematical formula 1 described above. L*(15°), L*(110°), and L*(45°) refer to the luminance measured at angles 15°, 110°, and 45°, respectively. As the flop index value increases, the gloss level increases to exhibit a metallic feel.

TABLE 1

| | Color mixed pigment | | | | |
|---|---|---|---|---|---|
| | Polyol polymer composition | Metallic gloss pigment | Nano-color pigment | General color pigment | Curing agent |
| Color coating layer mixture 1 | 85.25 wt % | 14.75 wt %% | 0 wt % | 0 wt % | add 14.3 parts by weight with respect to 100 parts by weight of polyol polymer composition |
| Color coating layer mixture 2 | 95 wt % | 0 wt % | 5 wt % | 0 wt % | add 14.3 parts by weight with respect to 100 parts by weight of polyol polymer composition |
| Color coating layer mixture 3 | 95 wt % | 0 wt % | 0 wt % | 5 wt % | add 14.3 parts by weight with respect to 100 parts by weight of polyol polymer composition |
| Color coating layer mixture 4 | 80.25 wt % | 14.75 wt % | 5 wt % | 0 wt % | add 14.3 parts by weight with respect to 100 parts by weight of polyol polymer composition |
| Color coating layer mixture 5 | 80.25 wt % | 14.75 wt % | 0 wt % | 5 wt % | add 14.3 parts by weight with respect to 100 parts by weight of polyol polymer composition |

The polyol polymer composition was produced by mixing polyol resin (35 to 55 wt %), toluene (5 to 15 wt %), n-butyl acetate (5 to 15 wt %), methyl iso-butyl ketone (5 to 15 wt %), propylene glycol methyl ether acetate (1 to 10 wt %), and an additive (0.1 to 10 wt %).

The color mixed pigment described above was used by mixing a metallic gloss pigment (pearl color, particle size D50=21 to 24 μm, product name: Reflex Rutile Dazzling Standard), and a general color pigment (average diameter of 5 to 10 μm) or a nano-color pigment (average diameter of 100 to 500 nm). The color pigment described above includes a white pigment defined by RGB=255, 255, 255 (HEX=#FFFFFF), a blue pigment defined by RGB=0, 204, 153 (HEX=#00cc99), a pink pigment defined by RGB=255, 102, 102 (HEX=#ff6666), and a yellow pigment defined by RGB=255, 255, 0 (HEX=#ffff00).

For example, if the flop index value is 0 to 1 (exclusive), it corresponds to a surface having no metallic feel. If the flop index value is 1 to 9, the surface exhibits weak light reflection, and the metallic texture can be recognized with a naked eye. If the flop index value is 1 to 5, the surface exhibits a faint pearl-like metallic texture. In addition, if the flop index value is around 11, it corresponds to an automobile coating level formed on a metal surface that exhibits strong light reflection. If the flop index value is 15 or higher, it corresponds to a lustrous metallic surface.

If the flop index value of the golf ball is 9 or higher, visibility may be satisfactory, but the reflected light is strong. Therefore, a golf player may feel uncomfortable. If the flop index value is lower than 1, there is no metallic texture at all and no effect of visibility improvement caused by the metallic gloss pigment.

The present invention is for manufacturing a color golf ball having a soft metallic texture whose reflected light does not interfere with play while providing excellent visibility due to gloss. The golf ball according to the present invention is obtained by using a metallic gloss pigment and a color pigment and preferably has a flop index value of 1 to 9, and more preferably, 1 to 6.

TABLE 2

|  | Sample | Color coating layer mixture | | Flop index value |
|---|---|---|---|---|
|  |  | Type | Color type |  |
| Comparative Example 1 | Surlyn sample | no | — | 0.28 |
| Example 1 | Surlyn sample | color coating layer mixture 1 | — | 7.93 |
| Example 2 | Surlyn sample | color coating layer mixture 2 | white | 0.12 |
| Example 3 | Surlyn sample | color coating layer mixture 3 | white | 0.13 |
| Example 4 | Surlyn sample | color coating layer mixture 4 | white | 8.07 |
| Example 5 | Surlyn sample | color coating layer mixture 5 | white | 2.88 |
| Comparative Example 2 | Standard sample | no | — | 0.18 |
| Example 6 | Standard sample | color coating layer mixture 1 | — | 5.22 |
| Example 7 | Standard sample | color coating layer mixture 2 | white | 0.2 |
| Example 8 | Standard sample | color coating layer mixture 3 | white | 0.2 |
| Example 9 | Standard sample | color coating layer mixture 4 | white | 4.41 |
| Example 10 | Standard sample | color coating layer mixture 5 | white | 1.74 |

The untreated Surlyn sample has nearly no metallic gloss, and has a flop index value of 0.28. Meanwhile, in the case of a Surlyn sample (Example 1) in which only the metallic gloss pigment is coated without applying the color pigment, it was recognized that metallic gloss (flop index of 7.93) is exhibited. It is considered that the aforementioned result is obtained because the metallic gloss pigment generates reflection that causes interference with the incident light.

In comparison, in the case of a Surlyn sample (Example 2) in which only the white nano-color pigment is coated without applying the metallic gloss pigment and a Surlyn sample (Example 3) in which only the white general color pigment is coated, the flop index value was 0.12 and 0.13, which is lower than the gloss level of the Surlyn sample itself.

Meanwhile, in the case of a Surlyn sample (Example 4) in which the color coating layer mixture 4 containing the metallic gloss pigment and the white nano-color pigment is coated and a Surlyn sample (Example 5) in which the color coating layer mixture 5 containing the metallic gloss pigment and the white general color pigment is coated, metallic gloss higher than the gloss level of the Surlyn sample itself was recognized. In particular, in the case of Example 4 in which the nano-color pigment is used, the flop index was 8.07. Therefore, it was recognized that metallic gloss similar to that of the Surlyn sample (Example 1, flop index of 7.93) in which only the metallic gloss pigment is coated is obtained.

The aforementioned result means that, when the coating is applied to the surly sample by using only the color pigment, there is no pigment that exhibits the flip-flop effect, and this rather degrades the gloss level of the Surlyn sample itself. In addition, when both the color pigment and the metallic gloss pigment are used, the metallic gloss is improved by the metallic gloss pigment, but the smaller particle size of the color pigment provides the higher gloss level. It is considered that the aforementioned result is because the larger particle size of the color pigment more severely hinders traveling the light reflected by the metallic gloss pigment to the outside, so that the metallic gloss property is degraded as a whole.

In order to check the results obtained by the Surlyn samples, the same experiment was performed using the standard sample formed of an ABS material. While the Surlyn samples are transparent, the standard sample has an opaque white color, so that it is conceivable that the standard sample corresponds to the white cover layer or mantle layer at the time of manufacturing the golf ball. As a result of the experiment, it was recognized that the metallic gloss was lower than that of the Surlyn sample as a whole, but development of the metallic gloss caused by the properties of the metallic gloss pigment and the color pigment is similar.

2. Color Coating Sample Having Metallic Gloss Treated with Lustrous Transparent Coating The outermost shell of the golf ball may have an outermost shell coating layer for protecting the golf ball. Generally, the outermost coating layer is finished with a lustrous transparent coating. The lustrous transparent coating was formed with a thickness of 3 to 10 μm by spraying polyurethane onto the color coating layer.

First, the ABS standard sample is coated with a white, pink, yellow, or blue color coating layer mixture 4 to a thickness of 3 to 10 μm, and the coat was dried. Then, the gloss level was measured by using the aforementioned method, and each flop index value was calculated. Then, polyurethane was sprayed onto the ABS standard sample coated with the white, pink, yellow, or blue color coating layer mixture 4 to form a lustrous transparent coating layer with a thickness of 3 to 10 μm, and the coat was dried. Then, the gloss level was measured by using the same method, and the flop index value was calculated (see Table 3).

TABLE 3

| | Sample | Color coating layer mixture Type | Color type | Flop index value Before lustrous transparent coating | Coating after lustrous transparent coating |
|---|---|---|---|---|---|
| Example 9 | standard sample | color coating layer mixture 4 | white | 4.41 | 4.21 |
| Example 11 | standard sample | color coating layer mixture 4 | pink | 6.72 | 5.7 |
| Example 12 | standard sample | color coating layer mixture 4 | yellow | 4.05 | 3.85 |
| Example 13 | standard sample | color coating layer mixture 4 | blue | 7.53 | 6.81 |

As a result of the experiment, it was recognized that the gloss level was slightly reduced by the lustrous transparent coating. It is considered that the aforementioned result is obtained because apart of the light is scattered on the surface of the lustrous coating, so that the amount of the light incident to the inside of the coating layer is reduced. It was recognized that there is a difference in the gloss level (flop index) depending on the color type of the nano-color pigment, and the gloss level is higher in the order of blue, pink, white, and yellow.

3. Color Golf Ball Having Soft Metallic Gloss

1) Manufacture of Color Golf Ball Having Soft Metallic Gloss

On the basis of the aforementioned results, a color golf ball having soft metallic gloss was manufactured.

The color golf ball having soft metallic gloss according to the present invention has an innermost core; a cover layer formed on the core; a cover coating layer formed on the cover layer; and a lustrous transparent coating layer formed on the cover coating layer.

In addition, the color golf ball having soft metallic gloss according to the present invention has an innermost core; a mantle layer formed on the core for improving a rotational force and durability of the golf ball; a cover layer formed on the mantle layer; a cover coating layer formed on the cover layer; and a lustrous transparent coating layer formed on the cover coating layer.

The core was manufactured by compression-molding of polybutadiene rubber. In this case, an opaque white pigment ($TiO_2$) was directly added so that the dark color peculiar to the polybutadiene rubber is not projected, or an opaque white pigment ($TiO_2$) was added to the mantle layer.

The cover layer was formed by applying injection molding to the core or the mantle layer manufactured as described above. The cover layer was formed by mixing a polymer resin containing polyol, a white pigment or color pigment, and an additive to produce a cover mixture, which was injection-molded onto the core.

The color coating layer was formed on the cover layer. The color coating layer was formed by mixing a polymer resin composition, a nano-color pigment, a metallic gloss pigment, and a curing agent with an organic solvent to produce a color coating layer mixture, and then spraying the color coating layer mixture onto the cover layer. The color coating layer mixture is prepared by mixing the polymer resin composition (80.25 wt %), the color pigment (5 wt %), and the metallic gloss pigment (14.75 wt %), and then adding 14.3 parts by weight of a polyisocyanate-based curing agent with respect to 100 parts by weight of the polymer resin composition. The polymer resin composition was produced by mixing a polyol resin (35 to 55 wt %), toluene (5 to 15 wt %), n-butyl acetate (5 to 15 wt %), methyl iso-butyl ketone (5 to 15 wt %), propylene glycol methyl ether acetate (1 to 10 wt %), and an additive (0.1 to 10 wt %). The color coating layer was produced by spray-coating the color coating layer mixture on the cover layer twice until the thickness becomes 3 to 10 µm. Preferably, the color coating layer has a thickness of 4.5 to 6 µm.

The lustrous transparent coating layer was formed by spray-coating the polyurethane solution produced using an organic solvent onto the color coating layer. The lustrous transparent coating layer has a thickness of 3 to 10 µm, and preferably, the color coating layer has a thickness of 4.5 to 6 µm.

2) Metallic Gloss of Color Golf Ball Having Soft Metallic Gloss (1) Measurement of Metallic Gloss of Color Golf Ball Having Soft Metallic Gloss According to the present invention, a color golf ball having soft metallic gloss was manufactured by adding a nano-color pigment having a white color (RGB=255, 255, 255 (HEX=#FFFFFF)), a pink color ((RGB=255, 102, 102 (HEX=#ff6666)), a yellow color (RGB=255, 255, 0 (HEX=#ffff00)), or a blue color (RGB=0, 204, 153 (HEX=#00cc99)) to the color coating layer.

In the course of manufacturing the golf ball, the gloss levels before and after forming the lustrous transparent coating layer were measured and compared (see Table 4).

TABLE 4

| | | Color coating layer mixture | | Flop index value | |
|---|---|---|---|---|---|
| | | Type | Color type | Before lustrous transparent coating | After lustrous transparent coating |
| Example 14 | golf ball | color coating layer mixture 4 | white | 4.31 | 3.44 |

TABLE 4-continued

|  |  | Color coating layer mixture | | Flop index value | |
|---|---|---|---|---|---|
|  |  | Type | Color type | Before lustrous transparent coating | After lustrous transparent coating |
| Example 15 | golf ball | color coating layer mixture 4 | pink | 6.27 | 4.09 |
| Example 16 | golf ball | color coating layer mixture 4 | yellow | 2.62 | 1.67 |
| Example 17 | golf ball | color coating layer mixture 4 | blue | 6.4 | 5.69 |

As a result of measuring the gloss levels of the golf balls on which the color coating layer containing the metallic gloss pigment and the nano-color pigment was formed, it is recognized that the gloss level is reduced, compared to the standard sample having the same color coating layer and the same lustrous transparent coating layer. It is considered that this is because of a difference that the coating layer of the standard sample is formed on a flat ABS substrate, and the coating layer of the golf ball is formed on a round Surlyn substrate. However, when the gloss levels are checked for the color coating layer and the lustrous transparent coating layer formed on the golf ball, it was recognized that the gloss level of the golf ball is reduced by the lustrous transparent coating layer as in the standard sample whose gloss level was reduced by the lustrous transparent coating layer. In addition, it is recognized that the golf balls according to the present invention having pink, yellow, blue, and white colors have gloss levels (flop index values) of 4.09, 1.67, 5.69, and 3.44, respectively, by which light is reflected faintly, and a soft metallic texture is exhibited.

(2) Measurement of Gloss Levels for Color Golf Balls Formed by Using Metallic Gloss Pigment and Metal-Deposited Golf Balls By measuring the gloss level for the examples described above, it was experimentally proved that the color golf ball according to the present invention smoothly reflects light and provides a soft metallic feel.

Therefore, the gloss levels were measured for the color golf balls formed by using the metallic gloss pigment and the metal-deposited golf balls of other manufacturers and were compared with the golf ball according to the present invention (see Table 5).

The PHYZ (white), the DRG ALL STAR (pink), and the PHYZ (yellow) are metallic gloss color golf balls finished by forming a lustrous transparent coating layer mixed with a general metallic gloss pigment. The KIRA (white) and the KIRA (yellow) are golf balls obtained by adding a pearl pigment to the cover and finished with a lustrous coating. In addition, the CHROMAX GOLD (gold) is a metal-deposited golf ball obtained by forming a gold-colored leaf layer by depositing gold-colored metal particles on the coating layer to produce a gold leaf layer and finished by forming a cover and a lustrous transparent coating layer on the gold leaf layer.

As the flop index value increases, the glossiness increases to provide a metallic texture. For example, if the flop index value is 0 to 1 (exclusive), it corresponds to a surface having no metallic texture. If the flop index value is 1 to 9, it corresponds to a surface on which weak light reflection is exhibited, and the metallic texture is recognizable. If the flop index value is 1 to 5, it shows a faint pearl-like metallic texture. In addition, if the flop index value is around 11, it corresponds to an automobile coating level formed on a metal surface that exhibits strong light reflection. If the flop index value is 15 or higher, it corresponds to a glossy metallic surface.

It was recognized that the golf ball according to the present invention has a flop index value of 1.67 to 5.60 depending on colors. The aforementioned result means that the golf ball according to the present invention has a soft metallic texture and excellent visibility, and its reflection light is not strong so as not to interfere with play.

TABLE 5

| Product name | Color | Metallic gloss pigment | Color layer formation method | Flop index |
|---|---|---|---|---|
| Example 14 | white | pearl | polymer coating | 3.44 |
| Example 15 | pink | pearl | polymer coating | 4.09 |
| Example 16 | yellow | pearl | polymer coating | 1.67 |
| Example 17 | blue | pearl | polymer coating | 5.69 |
| PHYZ | white | pearl | polymer coating | 0.61 |
| KIRA | white | pearl | cover | 0.92 |
| DRG All star | pink | pearl | polymer coating | 0.01 |
| PHYZ | yellow | pearl | polymer coating | 0.12 |
| KIRA | yellow | pearl | cover | 0.72 |
| CHROMAX GOLD | gold | golden metal | deposition | 41.69 |

In Examples 14, 15, 16 and 17 of the present invention, the golf balls were finished by forming a color coating layer using a color coating layer mixture produced by mixing a nano-color pigment and a metallic gloss pigment, and forming a lustrous transparent coating layer on the color coating layer.

In comparison, some of other manufacturer's metallic gloss color golf balls (such as PHYZ (white), KIRA (white), DRG ALL STAR (pink), PHYZ (yellow), and KIRA (yellow)) have flop index values lower than 1. This means that they can exhibit colors but fail to provide the metallic texture.

In addition, some of other manufacturer's metal-deposited golf balls (such as CHROMAX GOLD (gold)) have a flop index higher than 40. This allows the golf balls to exhibit a glittering gold color and provide excellent visibility. However, it is considered that the reflected light is too strong, which may hinder play.

4. Measurement of Color Difference

The color difference was measured for the color cover layer used for the golf ball according to the present invention. The color differences of each of the color cover layers described above were measured using a spectrocolorimeter (CM-2500d, Konica Minolta Co. Ltd.), and the color difference ΔE was calculated by measuring the color coordinates (L*a*b*). The color difference was calculated using the following Mathematical Formula 2.

$$\Delta E(L^*, a^*, b^*) = \{(\Delta L^*)^2 + (\Delta a^*)^2 + (\Delta b^*)^2\}^{1/2} \quad \text{[Mathematical Formula 2]}$$

The aforementioned value L* refers to brightness. "L*=0" means black. "L*=100" means white. The value a* refers to whether it is biased toward red or green. If the value a* is negative, it means a color biased toward green. If the value a* is positive, it means a color biased toward red. The value b* refers to whether it is biased toward yellow or blue. If the value b* is negative, it means a color biased toward blue. If the value b* is positive, it means a color biased toward yellow.

The aforementioned value ΔL* refers to a difference of the value L* between the standard sample and the sample of the example. The value Δa* refers to a difference of the value a* between the standard sample and the sample of the example. The value Δb* refers to a difference of the value b* between the standard sample and the sample of the example.

Table 6 shows results of measuring the color coordinates (L*a*b*) after forming a color coating layer having a thickness of 3 to 10 μm on the Surlyn sample.

TABLE 6

| | Sample | Color coating layer mixture Type | Color type | L* | a* | b* |
|---|---|---|---|---|---|---|
| Comparative Example 3-1 | Surlyn sample | color coating layer mixture 2 | white | 82.73 | −0.26 | −0.01 |
| Comparative Example 3-2 | Surlyn sample | color coating layer mixture 2 | pink | 81.24 | 18.26 | 5.88 |
| Comparative Example 3-3 | Surlyn sample | color coating layer mixture 2 | yellow | 92.66 | −5.39 | 99.07 |
| Comparative Example 3-4 | Surlyn sample | color coating layer mixture 2 | blue | 75.59 | −32.23 | −3.25 |
| Example 18-1 | Surlyn sample | color coating layer mixture4 | white | 85.16 | −0.59 | −3.55 |
| Example 18-2 | Surlyn sample | color coating layer mixture 4 | pink | 82.17 | 15.75 | 5.07 |
| Example 18-3 | Surlyn sample | color coating layer mixture 4 | yellow | 91.25 | −1.87 | 45.69 |
| Example 18-4 | Surlyn sample | color coating layer mixture 4 | blue | 78.12 | −26.82 | −3.19 |
| Comparative Example 4-1 | Surlyn sample | color coating layer mixture3 | white | 86.14 | −1.1 | −1.85 |
| Comparative Example 4-2 | Surlyn sample | color coating layer mixture 3 | pink | 74.15 | 25.04 | 9.13 |
| Comparative Example 4-3 | Surlyn sample | color coating layer mixture 3 | yellow | 88.65 | 6.25 | 95.17 |
| Comparative Example 4-4 | Surlyn sample | color coating layer mixture 3 | blue | 71.09 | −21.14 | −3.34 |
| Example 19-1 | Surlyn sample | color coating layer mixture 5 | white | 87.34 | −0.93 | −1.26 |
| Example 19-2 | Surlyn sample | color coating layer mixture 5 | pink | 76.93 | 20.66 | 6.65 |
| Example 19-3 | Surlyn sample | color coating layer mixture 5 | yellow | 88.06 | 6.31 | 37.71 |
| Example 19-4 | Surlyn sample | color coating layer mixture 5 | blue | 73.74 | −19.28 | −3.62 |

Table 7 shows results of calculating the color difference using the measured color coordinates (L*a*b*).

TABLE 7

| | Pigment type | Color type | Color difference (ΔE) | Remarks |
|---|---|---|---|---|
| Color difference caused by metallic gloss pigment | Nano-color pigment | white | 3.35 | color difference between Comparative Example 3-1 and Example 18-1 |
| | | pink | 2.79 | color difference between Comparative Example 3-2 and Example 18-2 |
| | | yellow | 53.51 | color difference between Comparative Example 3-3 and Example 18-3 |
| | | blue | 5.97 | color difference between Comparative Example 3-4 and Example 18-4 |

TABLE 7-continued

| | Pigment type | Color type | Color difference (ΔE) | Remarks |
|---|---|---|---|---|
| | General color pigment | white | 1.34 | color difference between Comparative Example 4-1 and Example 19-1 |
| | | pink | 5.75 | color difference between Comparative Example 4-2 and Example 19-2 |
| | | yellow | 57.46 | color difference between Comparative Example 4-3 and Example 19-3 |
| | | blue | 3.25 | color difference between Comparative Example 4-4 and Example 19-4 |
| Color difference caused by pigment particle size | Nano-color pigment and general color pigment | white | 3.17 | color difference between Example 19-1 and Example 18-1 |
| | | pink | 7.35 | color difference between Example 19-2 and Example 18-2 |
| | | yellow | 11.86 | color difference between Example 19-3 and Example 18-3 |
| | | blue | 8.73 | color difference between Example 19-4 and Example 18-4 |

Since the metallic gloss pigment generates reflection or diffused reflection, the amount of light inside the coating layer changes by further adding the metallic gloss pigment to the coating layer, which may cause a color sense change. When the metallic gloss pigment is further added to the nano-color pigments and general color pigments of each color, the color difference ΔE was calculated to know a change degree in the color sense.

As a result of the calculation, in the case of white, pink, and blue color pigments, the color difference value ΔE was 1.34 to 5.97, which shows that the change of the color sense is insignificant even by adding the metallic gloss pigment. This result means that, in the case of white, pink, and blue color pigments, a similar color sense is maintained even by adding the metallic gloss pigment, regardless of the pigment particle size. However, in the case of the yellow color pigment, as a result of adding the metal gloss pigment to the nano-color pigment, the color difference value was ΔE=53.51. In addition, as a result of adding the metallic gloss pigment to the general color pigment, the color difference value was ΔE=57.46. This means that the yellow color pigment has a greater change in the color sense caused by the metallic gloss pigment, compared to the other color pigments. Meanwhile, adding the metallic gloss pigment to the yellow color pigment reduces the value b*. This means that a light pastel tone yellow color is exhibited by adding the metallic gloss pigment (see Table. 6).

Color differences between a sample coated with a color coating layer mixture containing the nano-color pigment and the metallic gloss pigment and a sample coated with a color coating layer mixture containing the general color pigment and the metallic gloss pigment were calculated for each color. As a result of the calculation, the color difference value was ΔE=3.17 to 11.86, and it was recognized that the difference of the color sense was insignificant between a case where the nano-color pigment was used and a case where the general color pigment was used.

Referring to the result of Table 2, the flop index values of the Surlyn samples using the nano-color pigment and the metallic gloss pigment (Examples 4 and 9) and the Surlyn samples using the general color pigment and the metallic gloss pigment (Examples 5 and 9) were 8.07 (Example 4), 4.41 (Example 9), 2.88 (Example 5), and 1.74 (Example 10), respectively. Therefore, it was recognized that the flop index values obtained by using the nano-color pigment are 2.5 to 2.8 times higher.

Therefore, when a coating layer is formed by using the color coating mixture produced by mixing the nano-color pigment and the metallic gloss pigment according to the present invention, it is considered that a coating layer having 2.5 to 2.8 times higher metallic gloss can be formed while maintaining a color sense similar to the case of the general color pigment.

The specific examples described herein are intended to represent desirable implementations or examples of the present invention, and are not intended to limit the scope of the invention. It would be apparent to those skilled in the art that any modification of the present invention or other applications do not depart from the scope of the present invention described in the claims.

What is claimed is:

1. A color golf ball comprising:
   a core;
   a cover layer formed on the core; and
   a color coating layer formed on the cover layer,
   wherein the color coating layer contains a polymer resin composition, a nano-color pigment, and a metallic gloss pigment, wherein the polymer resin composition comprises polyol resin, toluene, n-butyl acetate, methyl iso-butyl ketone, propylene glycol methyl ether acetate, and an additive.

2. The color golf ball according to claim 1, wherein the nano-color pigment has an average particle size of 100 to 700 nm.

3. The color golf ball according to claim 1, wherein the metallic gloss pigment of the color coating layer has an average particle size of 5 to 100 μm.

4. The color golf ball according to claim 1, wherein the color coating layer contains the nano-color pigment and the nano-color pigment and the metallic gloss pigment at a weight ratio of 1:0.2 to 1:20.

5. The color golf ball according to claim 1, further comprising a transparent coating layer formed on the color coating layer.

6. The color golf ball according to claim 1, wherein the color golf ball has a flop index value of 1 to 9.

7. A color golf ball comprising:
   a core;
   a mantle layer formed on the core;
   a cover layer formed on the mantle layer; and
   a color coating layer formed on the cover layer,
   wherein the color coating layer contains a polymer resin composition, a nano-color pigment, and a metallic gloss pigment, and wherein the polymer resin composition comprises polyol resin, toluene, n-butyl acetate, methyl iso-butyl ketone, propylene glycol methyl ether acetate, and an additive.

8. The color golf ball according to claim 7, wherein the nano-color pigment has an average particle size of 100 to 700 nm.

9. The color golf ball according to claim 7, wherein the metallic gloss pigment of the color coating layer has an average particle size of 5 to 100 μm.

10. The color golf ball according to claim 7, wherein the color coating layer contains the nano-color pigment and the nano-color pigment and the metallic gloss pigment at a weight ratio of 1:0.2 to 1:20.

11. The color golf ball according to claim 7, further comprising a transparent coating layer formed on the color coating layer.

12. The color golf ball according to claim 7, wherein the color golf ball has a flop index value of 1 to 9.

13. The color golf ball according to claim 1, wherein the color coating layer has a thickness of 4.5 to 6 μm.

14. A method of forming a color golf ball, the method comprising:
    forming a cover layer on a core; and
    forming a color coating layer on the cover layer,
    wherein the color coating layer contains a polymer resin composition, a nano-color pigment, and a metallic gloss pigment, wherein the polymer resin composition comprises polyol resin, toluene, n-butyl acetate, methyl iso-butyl ketone, propylene glycol methyl ether acetate, and an additive.

15. The method according to claim 14, further comprising forming a transparent coating layer on the color coating layer.

16. The method according to claim 14, wherein forming the color coating layer on the cover layer comprises dipping the cover layer on the core into a mixture of the polymer resin composition, the nano-color pigment, and the metallic gloss pigment.

17. The method according to claim 14, wherein forming the color coating layer on the cover layer comprises spraying a mixture of the polymer resin composition, the nano-color pigment, and the metallic gloss pigment onto the cover layer.

18. The method according to claim 17, wherein spraying the mixture of the polymer resin composition, the nano-color pigment, and the metallic gloss pigment onto the cover layer comprises spraying the mixture of the polymer resin composition, the nano-color pigment, and the metallic gloss pigment onto the cover layer until the color coating layer has a thickness of 3 to 10 μm.

* * * * *